(12) United States Patent
Scalera

(10) Patent No.: US 9,869,594 B2
(45) Date of Patent: Jan. 16, 2018

(54) CONTROLLER FOR STEAM BATH HAVING MULTIPLE TEMPERATURE SENSORS

(71) Applicant: STEAMIST, INC., East Rutherford, NJ (US)

(72) Inventor: James Rocco Scalera, Cedar Grove, NJ (US)

(73) Assignee: Steamist, Inc., East Rutherford, NJ (US)

( * ) Notice: Subject to any disclaimer, the term of this patent is extended or adjusted under 35 U.S.C. 154(b) by 638 days.

(21) Appl. No.: 14/072,129

(22) Filed: Nov. 5, 2013

(65) Prior Publication Data

US 2014/0129043 A1    May 8, 2014

Related U.S. Application Data

(60) Provisional application No. 61/722,428, filed on Nov. 5, 2012.

(51) Int. Cl.
*G01K 3/14* (2006.01)
*G05D 23/19* (2006.01)

(52) U.S. Cl.
CPC ............ *G01K 3/14* (2013.01); *G05D 23/1931* (2013.01)

(58) Field of Classification Search
CPC ............................. G01K 3/14; G05D 23/1931
USPC ........................................................ 700/299
See application file for complete search history.

(56) References Cited

U.S. PATENT DOCUMENTS

| 4,947,678 | A | * | 8/1990 | Hori | G01N 33/4905 374/21 |
|---|---|---|---|---|---|
| 8,818,481 | B2 | * | 8/2014 | Bly | A61B 5/4875 600/301 |
| 9,585,584 | B2 | * | 3/2017 | Marek | A61B 5/0404 |
| 2007/0108185 | A1 | * | 5/2007 | Elnar | A61H 33/0095 219/481 |
| 2011/0051778 | A1 | * | 3/2011 | Kloiber | G01K 7/223 374/185 |
| 2011/0069459 | A1 | * | 3/2011 | Padiy | A61B 5/01 361/748 |
| 2015/0226460 | A1 | * | 8/2015 | Zemach | F24D 17/0021 700/90 |
| 2017/0017315 | A1 | * | 1/2017 | Laflamme | G06F 3/041 |

FOREIGN PATENT DOCUMENTS

CN        102411384 A  *  4/2012

* cited by examiner

*Primary Examiner* — Kenneth M Lo
*Assistant Examiner* — Michael J Huntley
(74) *Attorney, Agent, or Firm* — Lauletta Birnbaum LLP

(57) ABSTRACT

A controller and method for controlling the temperature of a steam room. The controller comprises a backing plate and a housing that serves as a moisture barrier. The housing comprises an overlay portion and mounts to the backing plate. A circuit board is mounted to the backing plate. One or more primary temperature sensors are mounted to the circuit board and located within the housing, are spaced above the circuit board, and are biased against the overlay portion. One or more secondary temperature sensors are located within the housing to sense a temperature of a backside of the respective one of more primary temperature sensors wherein an estimation of a temperature of the steam room is obtained.

16 Claims, 4 Drawing Sheets

CONTROLLER FOR STEAM BATH HAVING MULTIPLE TEMPERATURE SENSORS

CROSS-REFERENCE TO RELATED APPLICATIONS

This application claims priority to U.S. Provisional Patent Application 61/722,428 filed on Nov. 5, 2012.

STATEMENT REGARDING FEDERALLY SPONSORED RESEARCH OR DEVELOPMENT

The present invention was not developed with the use of any Federal Funds, but was developed independently by the inventor.

BACKGROUND

1. Field

The invention relates to a more accurate and faster responding method of measuring the temperature inside a steam bath.

2. Background

Steam baths, due to their wet environment and rapidly changing temperatures, have a unique difficulty in sensing the ambient temperature of the steam room. The wet environment of the steam room requires that the temperature sensor be sealed inside a housing. This housing protects the sensor from the moisture but also prevents the sensor from quickly and accurately sensing the temperature of the steam room. As a steam room heats up, the sensor reads a much lower temperature than that of the actual steam room. This problem is most evident during the initial heat up and tends to diminish as the room temperature is being maintained. As a result, the room temperature tends to have a very large overshoot and then slowly drops toward the intended setting after an extended lapse of time.

The chart depicted in FIG. 1 shows the performance of an existing control with a single sensor located behind the overlay or front surface of the housing cover. The line 102 depicts the actual temperature reading of the control sensor. In this case, the set point of the controller has been set to 105° F. (40.5° C.) as shown along the Y-axis. The control sensor reaches 105° F. (40.5° C.) set point and the control throttles back the heater to maintain that temperature. The control sensor appears to control the room temperature quite well. The line 104, however, shows the temperature of the steam room as measured by an independent thermocouple located approximately 6" off the wall in front of the controller. The temperature sensed by the independent thermocouple is what the steam bather actually feels.

The result is that the temperature of the steam room significantly overshoots the set-point temperature by approximately 10° F. (5.6° C.) and even though the steam room actually reaches the set point temperature after only 5 minutes has elapsed, the controller does not register this temperature until nearly an additional eleven minutes has passed, as shown in FIG. 1.

In contrast, if the steam generator is controlled by the thermocouple hanging 6" (15.24) off the wall the bather would have a more enjoyable experience since the controller would not overshoot the set point. As a result, there is a need for a controller that is capable of controlling a steam generator would to save energy by not overheating the room and increase comfort as the desired programmed temperature is reached much sooner with less overshoot.

Having a sensor protrude into the steam room far enough to accurately measure the room's temperature, however, is not considered aesthetically pleasing in a steam room or shower environment. Manufacturers typically have sacrificed performance for aesthetics. Thus, there is a need to for a controller that is capable of sensing and measuring the ambient temperature in the steam room from a location that is actually at a different temperature and that is capable of satisfying both aesthetic and performance considerations.

The above references are incorporated by reference herein where appropriate for appropriate teachings of additional or alternative details, features and/or technical background.

SUMMARY

A controller and method for controlling the temperature of a steam room. The controller comprises a backing plate and a housing that serves as a moisture barrier. The housing comprises an overlay portion and mounts to the backing plate. A circuit board is mounted to the backing plate. One or more primary temperature sensors are mounted to the circuit board and located within the housing, are spaced above the circuit board, and are biased against the overlay portion. One or more secondary temperature sensors are located within the housing to sense a temperature of a backside of the respective one of more primary temperature sensors wherein an estimation of a temperature of the steam room is obtained. The one or more primary sensors and the one or more secondary sensors establish a temperature differential therebetween. The sensors may be thermistors. In one form of the invention the circuit board is a flexible circuit board, the one or more primary sensors are mounted to the flexible circuit board, the flexible circuit board biases the primary sensor in compression against the overlay. The one or more primary sensors may be in direct contact with the overlay and the one or more primary sensors have a cuboidal shape that contacts the overlay on one side thereof and the temperature is sensed from all sides thereof.

In one form of the invention, at least one of the one or more secondary sensors are mounted to the circuit board behind one of the primary sensors to read the ambient temperature surrounding the backside of the primary sensor.

A microprocessor may be provided to take the temperature reading from one of the primary sensors and subtracts the temperature reading from one of the secondary sensors to determine a differential which is added to the primary sensor temperature to get a more accurate estimation of the actual steam room temperature. The differential may be further multiplied by a constant before being added to the primary temperature reading, the constant is derived from a compensation sensor formula: $((PS-SS)/K)+PS$, wherein PS=primary sensor temperature
SS=secondary sensor temperature
K=constant based on the characteristics of the control.

BRIEF DESCRIPTION OF THE DRAWINGS

The embodiments will be described in detail with reference to the following drawings in which like reference numerals refer to like elements wherein.

DETAILED DESCRIPTION

To overcome these and other problems of existing controllers, the controller 10 of the present invention uses multiple temperature sensors within the housing. In addition, an algorithm that more quickly and accurately predicts the temperature of the actual steam room may be employed by the controller 10.

Figure 1:
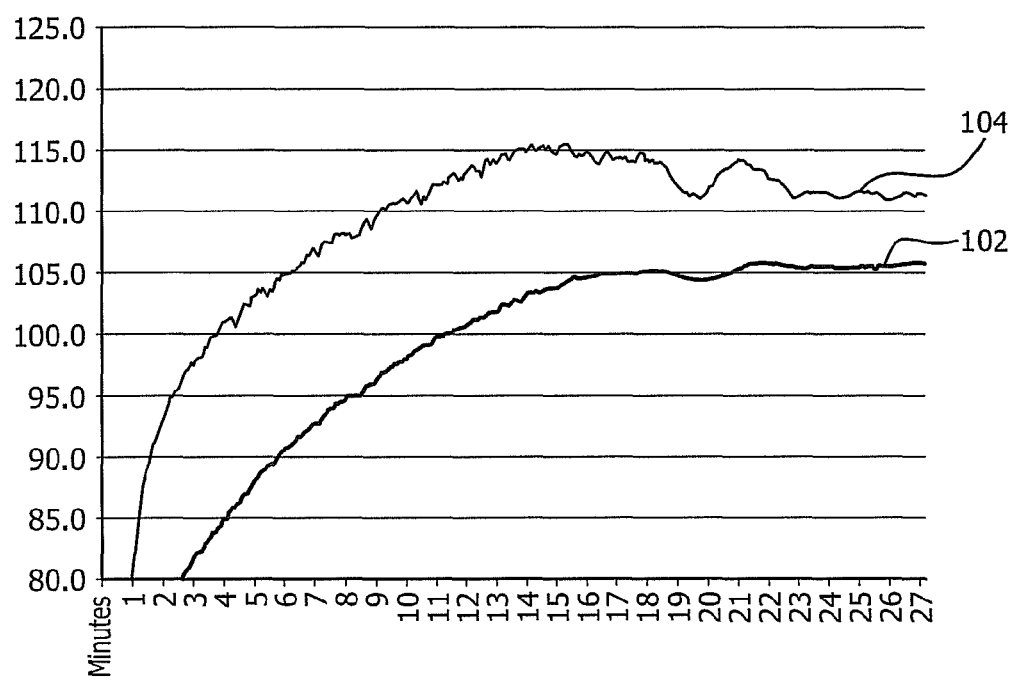
FIG. 1 is a graph showing the performance of an existing control with a single sensor behind the overlay.
Figure 2:
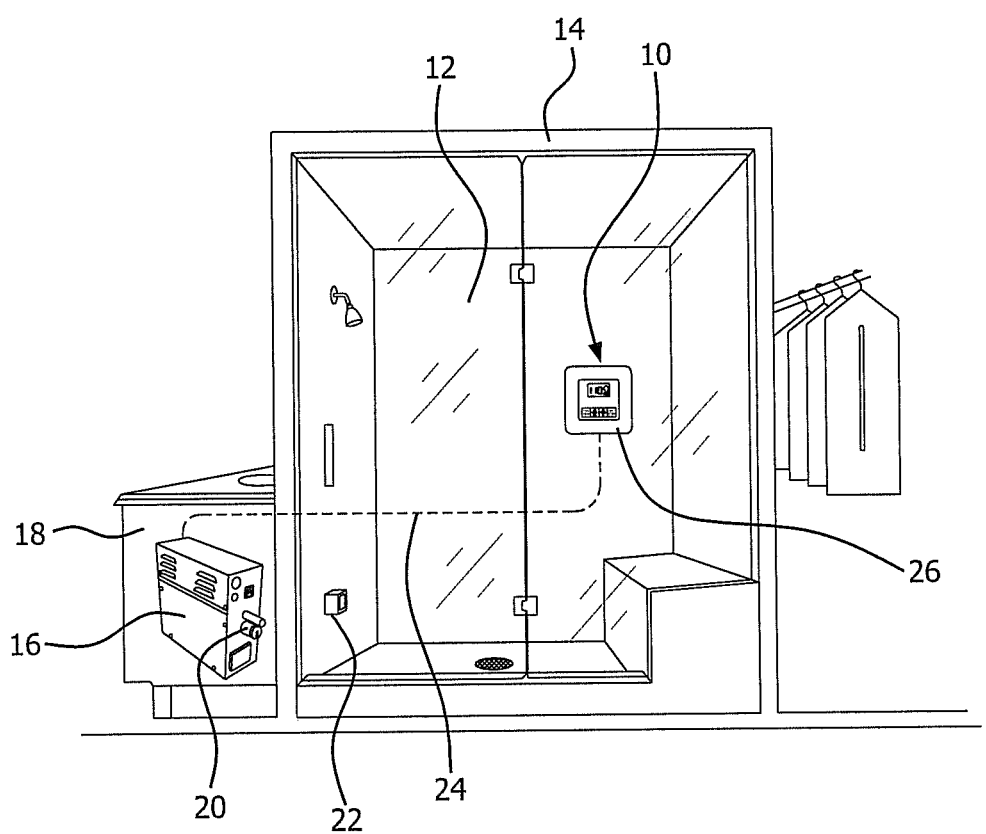
FIG. 2 depicts the controller of the present invention located in a steam room having a steam generator.
Figure 3:
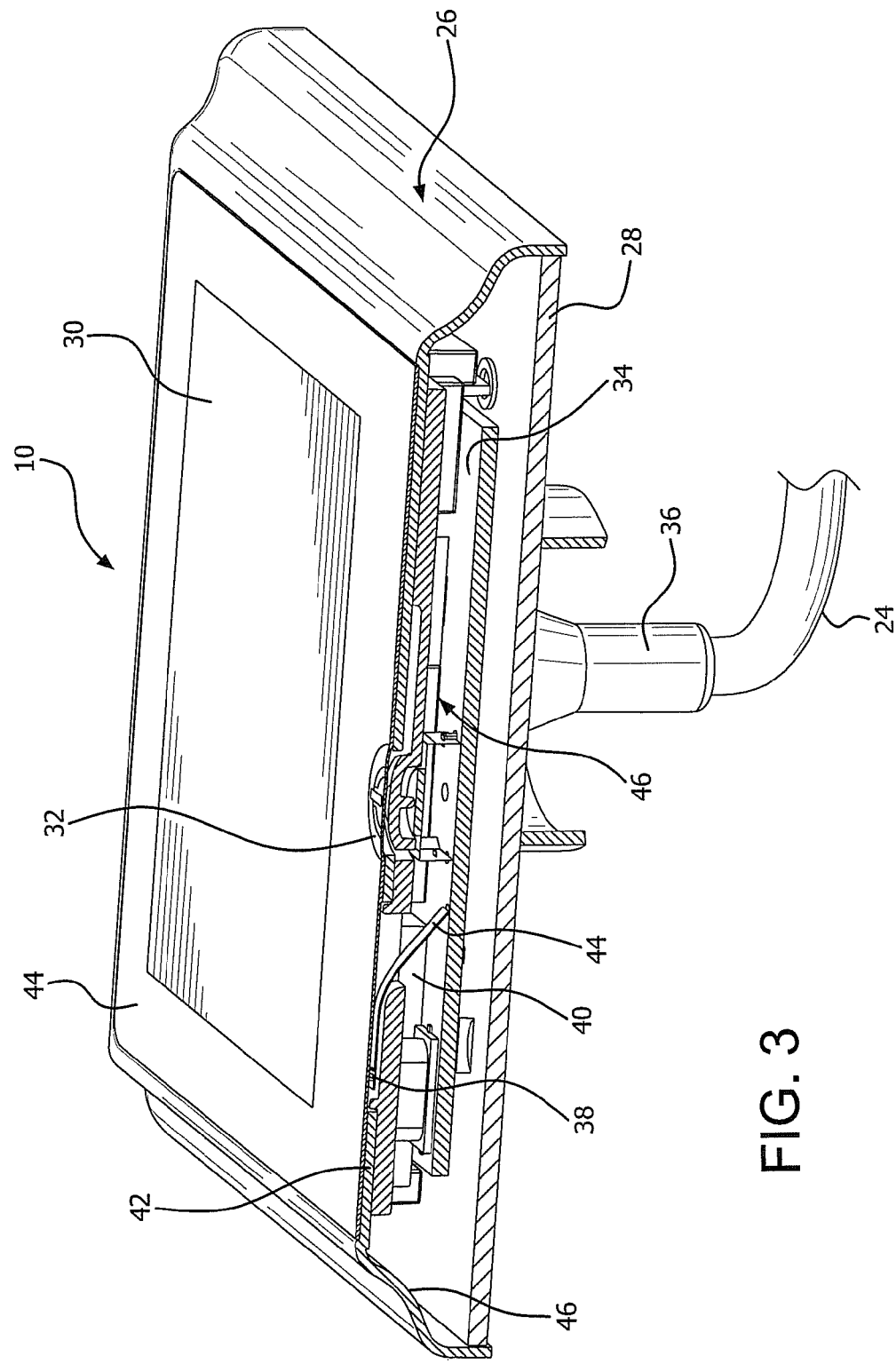
FIG. 3 is a cut away partial isometric view of the controller of FIG. 2.

In FIGS. 2 and 3, there is shown the controller 10 mounted to a wall 12 of a steam bath enclosure or shower 14. The steam bath 14 includes a steam generator 16, typically located in an inconspicuous location, such as a nearby vanity 18 or closet, or in a remote area, such as an attic or basement. The steam generator 16 includes a steam outlet 20 which introduces steam into the steam bath 14 via a steam head 22 by a typical piping connection (not shown). A control cable 24 or wireless communication may be provided between the controller 10 and the steam generator 16. Also included are any necessary water lines, drain lines, and electrical power connections (all not shown for simplicity).

Referring now to FIG. 3, the controller 10 includes an external housing cover 26, hereinafter housing 26. The housing 26 is preferably fabricated from a durable moisture resistant material, such as metal or the like. The housing 26 serves as a moisture barrier. A backing plate 28 serves as the rear of the housing 26. A display and user controls are typically located on the front face of the housing 26. In the instant case, a touchscreen display and control 30 is located on the front face of the housing 26. A power on/off control switch 32 is also located on the front face of the housing 26.

A circuit board (PCB) 34 is mounted to the interior face of the backing plate 28. A strain relief 36 is located on the exterior surface of the backing plate 28 for accepting the control cable 24 therethrough. One or more primary sensors 38 and one or more secondary sensors are provided as discussed in greater detail below.

The one or more primary temperature sensors 38 are placed behind the moisture barrier formed by the housing 26. One side 44 of the barrier is in contact with the steam room 14 and the other side 46 of the barrier is in contact with the primary sensor 38 to form an overlay 42.

Even though the primary sensor(s) 38 are in close proximity to the surface or overlay 42 of the housing, the primary sensor(s) 38 are still mostly influenced by the temperature inside the housing 26.

As best seen in FIG. 2, typically, the housing 26 needs to heat up to the steam room temperature before the primary sensor 38 located within the housing 26 is capable of accurately reading the steam room temperature. Additionally, the housing 26 is mounted to the wall 12 of the steam room 14 which serves as a major heat sink, preventing the controller 10 from heating up more quickly.

Referring now back again to FIG. 3, by adding an additional secondary sensor(s) 40 inside the housing 26 to measure the housing temperature behind the primary sensor a temperature differential is established between the primary sensor(s) 38 and the secondary sensor(s) 40. This differential can be used to calculate the actual steam room 14 temperature far more accurately than existing designs. Through testing the relationship of this differential can be combined with the primary sensor 38 reading to eliminate any error.

The sensors used in the present invention are preferably thermistors. Thermistors vary resistance with temperature and the ones selected for this design are very small to keep their thermal mass at a minimum. Although, the type of sensor is not critical to the design, the smaller physical mass of the sensor gives and added benefit of a rapid temperature response as compared to other larger sensors. The resistance value of the thermistor sensors are measured by analog inputs of the control's microprocessor. A microprocessor 46 then reads the sensors and calculates the actual steam room temperature.

In the design shown, the primary sensor 38 is soldered to the flexible PCB 28. The PCB 28 via a flex circuit bend 44 holds the sensor 38 in compression against the overlay 42. This flexible design simplifies assembly and eliminates the otherwise needed precision tolerances required to maintain a substantially zero clearance between the sensor 38 and the overlay 42.

The primary sensor 38 is in direct contact with the overlay 42. The sensor 38 is preferably a six sided, cuboidal device and contact the overlay 42 preferably on one side only. The sensor 38 senses temperature from all sides. The actual reading is an average of all its sides. This is why it is advantageous to read the temperature of the internal surrounding environment of the primary sensor 38.

The secondary sensor 40 is soldered to the PCB behind the primary sensor 38. The location is less critical but should to be in a location that best reads the ambient temperature surrounding the backside of the primary sensor 38.

The microprocessor 46 uses the primary sensor 38 temperature reading and subtracts the secondary sensor 40 temperature reading to determine a differential. If that differential is added to the primary sensor 38 reading, a more accurate estimation of the actual room 14 temperature is obtained.

In actual practice the differential should be multiplied by a constant before added to the primary temperature reading. That constant is unique to that housing/PCB design. A Compensation Sensor Formula is as follow. For the design shown, the constant is 0.8:

$$\text{Compensation Sensor Formula: } ((PS-SS)/K)+PS$$

PS=primary sensor temperature
SS=secondary sensor temperature
K=constant based on the characteristics of the control and determined through testing.

Figure 4:
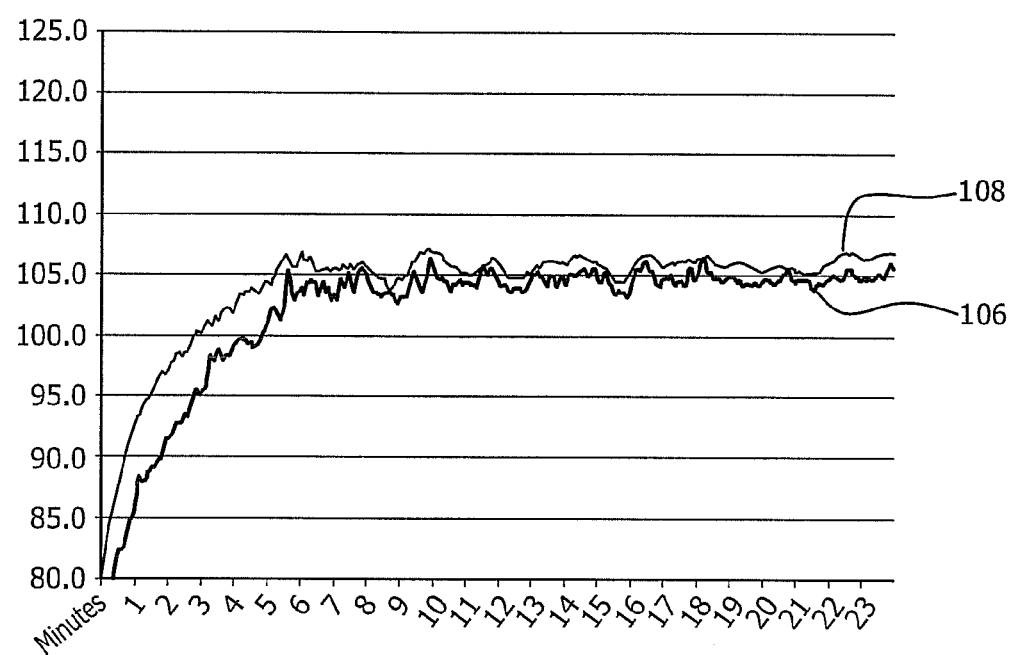
FIG. 4 is a graph of the effective performance of the controller of FIG. 2.

The results shown in FIG. 4 show the effective performance of the controller 10 of the present invention. The line 106 is the calculated temperature of the steam room as determined by the steam bath controller 10. The line 108 is the actual temperature of the steam room 14. The line 108 is the temperature the bather feels. A should be readily apparent, the controller 10 more accurately controls the temperature of the steam bath room 14 and more accurately reaches the desired set point temperature with less overshoot.

The present design has an additional benefit of reacting to temperature changes more rapidly. The primary sensor(s) will react more quickly to the changes in temperature than the secondary sensor(s). Therefore, the difference between the primary and secondary sensor is much greater with a rapid temperature change and is smaller with slow temperature changes. The faster the temperature changes the more the compensation reacts, again helping to better follow the actual room temperature.

Any reference in this specification to "one embodiment," "an embodiment," "example embodiment," and the like, means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A controller to control a temperature of an interior space of a steam room heated by steam from steam generator, the controller comprising:
   a backing plate to mount to an interior wall or surface of the steam room;
   a housing cover comprising an overlay interface portion, the housing cover mounts to the backing plate to form a housing space between the backing plate and the housing cover and serving as a barrier to prevent moisture in the interior of the steam room from entering the housing space, the housing cover having a front surface in contact with the interior space of the steam room and a rear surface in contact with the housing space;
   a circuit board mounted to the backing plate within the housing space;
   one or more primary temperature sensors mounted to the circuit board and located within the housing space, the one or more primary sensors being spaced proximate to and above the circuit board and being biased against a back surface of the overlay portion or the rear surface of the housing cover and distal to and away from the backing plate to measure a temperature immediately behind the housing cover; and
   one or more secondary temperature sensors located within the housing apace and located proximate to and nearer to the backing plate than the one or more primary sensors are located, creating an air gap between the one or more primary sensors and the one or more secondary sensors, the one or more secondary sensors sense a temperature of the air gap immediately behind a back surface of the respective one or more primary temperature sensors, wherein an estimation of an actual temperature of the interior space of the steam room is obtained from both the temperatures from the primary and secondary sensors that is more accurate than an estimate based on the temperature of the primary sensor alone.

2. The controller according to claim 1 wherein the one or more primary sensors and the one or more secondary sensors establish a temperature differential therebetween.

3. The controller according to claim 2 wherein the primary and secondary sensors are thermistors.

4. The controller according to claim 1 wherein the circuit board is a flexible circuit board, the one or more primary sensors are mounted to the flexible circuit board, the flexible circuit board biases the one or more primary sensor in compression against the back surface of the overlay.

5. The controller according to claim 4 wherein the one or more primary sensors are in direct contact with the back surface of the overlay, the one or more primary sensors have a cuboidal shape that contacts the back surface of the overlay on one side thereof and the temperature is sensed from all sides thereof.

6. The controller according to claim 3 wherein the circuit board is a flexible circuit board, the one or more primary sensors are mounted to the flexible circuit board, the flexible circuit board biases the one or more primary sensor in compression against the back surface of the overlay.

7. The controller according to claim 6 wherein the one or more primary sensors are in direct contact with the back surface of the overlay, the one or more primary sensors have a cuboidal shape that contacts the back surface of the overlay on one side thereof and the temperature is sensed from all sides thereof.

8. The controller according to claim 1 wherein at least one of the one or more secondary sensors are mounted to the circuit board behind one of the one or more primary sensors to read the ambient temperature of the air gap surrounding the back surface of the one or more primary sensors.

9. The controller according to claim 7 wherein at least one of the one or more secondary sensors are mounted to the circuit board behind one of the one or more primary sensors to read the ambient temperature surrounding the back surface of the one or more primary sensor.

10. The controller according to claim 1 further comprising a microprocessor that takes the temperature reading from one of the one or more primary sensors and subtracts the temperature reading from one of the one or more secondary sensors to determine a differential which is added to the primary sensor temperature to get a more accurate estimation of the actual temperature of the interior of the steam room.

11. The controller according to claim 9 further comprising a microprocessor that takes the temperature reading from one of the one or more primary sensors and subtracts the temperature reading from one of the one or more secondary sensors to determine a differential which is added to the primary sensor temperature to get a more accurate estimation of the actual temperature of the interior of the steam room.

12. The controller according to claim 10, wherein the differential is multiplied by a constant before being added to the primary temperature reading, the constant is derived from a compensation sensor formula: $((PS-SS)/K)+PS$, wherein
   PS=primary sensor temperature
   SS=secondary sensor temperature
   K=constant based on the characteristics of the control.

13. The controller according to claim 11, wherein the differential is multiplied by a constant before being added to the primary temperature reading, the constant is derived from a compensation sensor formula: $((PS-SS)/K)+PS$, wherein
   PS=primary sensor temperature
   SS=secondary sensor temperature
   K=constant based on the characteristics of the control.

14. A method to control a temperature of an interior space of a steam room heated by steam from a steam generator, comprising:
   providing a controller, the controller comprising: a backing plate to mount to an interior wall or surface of the steam room; a housing cover, the housing cover comprising an overlay interface portion, the housing cover mounts to the backing plate to form a housing space between the backing plate and the housing cover, the housing cover having a front surface in contact with the interior space of the steam room and a rear surface in contact with the housing space, the housing cover serving as a barrier to prevent moisture in the interior of the steam room from entering the housing space; a circuit board mounted to the backing plate within the housing space; one or more primary temperature sensors mounted to the circuit board and located within the housing space, the one or more primary sensors being spaced proximate to and above the circuit board and being biased against a back surface of the overlay portion or the rear surface of the housing cover and distal to and away from the backing plate to measure a temperature immediately behind the housing cover; and one or more secondary temperature sensors located within the housing space and located proximate to and nearer to the backing plate than the one or more primary sensors are located, creating an air gap between the one or more primary sensors and the one or more secondary sensors, the one or more secondary sensors sense a temperature of a back surface of the respective one or more primary temperature sensors through the air gap, wherein an estimation of an actual temperature of an interior space of the steam room is obtained from both the temperatures from the primary and secondary sensors that is more accurate than an estimate based on the temperature of the primary sensor alone;

taking a temperature reading from one of the one or more primary sensors;

subtracting the temperature reading from one of the one or more secondary sensors to determine a differential;

adding the differential to the primary sensor temperature to get a more accurate estimation of the actual temperature of the interior of the steam room; and controlling a steam generator based on the derived estimation of the steam room temperature.

15. The method according to claim 14 wherein the primary and secondary sensors are thermistors, wherein the circuit board is a flexible circuit board, the one or more primary sensors are mounted to the flexible circuit board, the flexible circuit board biases the one or more primary sensor in compression against the back surface of the overlay, wherein the one or more primary sensors are in direct contact with the back surface of the overlay, the one or more primary sensors have a cuboidal shape that contacts the back surface of the overlay on one side thereof and the temperature is sensed from all sides thereof, and wherein at least one of the one or more secondary sensors are mounted to the circuit board behind one of the one or more primary sensors to read the ambient temperature surrounding the back surface of the one or more primary sensor.

16. The method according to claim 15, wherein the subtracting and adding steps further comprise multiplying the differential by a constant before adding the differential to the primary temperature reading, the constant being derived from a compensation sensor formula: $((PS-SS)/K)+PS$, wherein PS=primary sensor temperature
SS=secondary sensor temperature
K=constant based on the characteristics of the control.

* * * * *